(12) United States Patent
Luck

(10) Patent No.: US 11,060,834 B1
(45) Date of Patent: Jul. 13, 2021

(54) TAPE MEASURE HAVING A LASER TRANSMISSION WINDOW

(71) Applicant: Mathew Patrick Luck, Renton, WA (US)

(72) Inventor: Mathew Patrick Luck, Renton, WA (US)

( * ) Notice: Subject to any disclaimer, the term of this patent is extended or adjusted under 35 U.S.C. 154(b) by 37 days.

(21) Appl. No.: 16/741,268

(22) Filed: Jan. 13, 2020

(51) Int. Cl.
| | |
|---|---|
| *G01B 3/10* | (2020.01) |
| *G01B 3/1056* | (2020.01) |
| *G01B 3/1003* | (2020.01) |
| *G01B 3/1089* | (2020.01) |
| G01B 3/1084 | (2020.01) |

(52) U.S. Cl.
CPC ......... *G01B 3/1056* (2013.01); *G01B 3/1003* (2020.01); *G01B 3/1089* (2020.01); *G01B 2003/1087* (2013.01)

(58) Field of Classification Search
CPC ... G01B 3/1056; G01B 3/1009; G01B 3/1003
USPC .......................................................... 33/771
See application file for complete search history.

(56) References Cited

U.S. PATENT DOCUMENTS

| | | | | |
|---|---|---|---|---|
| 3,261,100 A | * | 7/1966 | Quenot | G01B 3/1003 33/770 |
| 6,499,226 B1 | * | 12/2002 | Reda | G01B 3/1003 33/771 |
| 7,266,905 B1 | * | 9/2007 | Lee | G01B 3/1056 33/758 |
| 2009/0090016 A1 | * | 4/2009 | Roach | G01B 3/1003 33/770 |
| 2010/0031525 A1 | * | 2/2010 | Allezy | B32B 27/12 33/771 |
| 2018/0120080 A1 | * | 5/2018 | Park | G01B 3/1084 |
| 2020/0263969 A1 | * | 8/2020 | Zirbes | G01B 3/1056 |
| 2021/0025685 A1 | * | 1/2021 | Day | G01B 3/1071 |

* cited by examiner

*Primary Examiner* — George B Bennett
(74) *Attorney, Agent, or Firm* — Williams Kastner & Gibbs PLLC; Mark Lawrence Lorbiecki

(57) ABSTRACT

A tape measure to be reeled on a spool rotatably mounted within a housing defining an opening for paying out and for retrieval by rotation of the spool within in the housing. The tape measure includes a tape having a first end and a second end. The first end connected to the spool and the second end movable through the opening between a retracted position and an extended position. The tape includes a steel blade with length markings on the obverse. The blade extends along its length from the first end to the second end having a window. The window includes a pane of polymer. The polymer includes pigments to selectively transmit laser emitted from a laser level. The pane in held within the window in a manner allowing the reel to pay out and retract the blade in use.

17 Claims, 3 Drawing Sheets

FIG.1 *(Prior Art)*

TAPE MEASURE HAVING A LASER TRANSMISSION WINDOW

FIELD OF THE INVENTION

The method and system implicates measurement technology for use by construction trades, specifically to allow ergonomic measurement with tape measure in conjunction with a locating laser emitter.

BACKGROUND OF THE INVENTION

Due to the construction boom in major cities across the country, a lot of quality construction work is performed using a short timeline and on a tight budget. With little room in the budget for rework, saving time and labor is crucial to the project meeting deadlines and forecasts. To that end, laser levels are used daily as the go-to tool for contractors when referencing plumb, level, and square ("PLS"). PLS self-leveling laser levels are essential tools for laying out projects to ensure quality, accuracy to specifications, and cost savings.

Most laser levels are self-leveling so the contractor will rest the laser on a flat platform, magnetic bracket or on a level floor stand or tripod, and, once set, aim the laser towards the area of the layout. The laser point or line will be visible for most interior applications and the contractor will then mark the point or line to indicate where the material is to be installed. In areas of reduced visibility or longer range, green laser levels or laser detectors can be used to help complete the task. Laser levels drastically improve accuracy and time on the job site by providing a controlled point or line. Consistent checking, measuring, and calculating is replaced with establishing a reference point and setting the contractor's laser level to that point.

A dot laser level is also called the fixed point laser level. The dot level is usually used to transfer a level around a room, for an item. This type of laser level needs to be set on a fixed position in order to project a level margin of light on a plane from which one can make markings that can be used for positioning items or used for calculations. The dot laser level projects a bright spot on the plane or wall that can be transferred by moving the head of the laser leveling device. As this type of laser level is less complex than other types of laser levels, this is the simplest and easiest to set up and have the tendency of being cheaper and used for simpler applications.

The dot laser level is often used by electricians, small contractors, fencers, carpenters and masons. Contractors use the dot laser level to perform various home alignment tasks like setting foundations and footings, leveling of concrete platforms, interior walls layout, room additions or installation of partition, installing sprinkler systems, HVAC, plumbing and installing pipes, machinery and establishments. Electricians mostly use this type of laser level for installing various electrical fundamentals like electrical outlets and switches, conduit and wiring, track and canned lighting. Masons or brick craftsmen can use the dot laser leveling device in crafting the bricks by using the tool for squaring up batter boards and aligning bricks. Carpenters can also use the dot laser levels for finishing their carpentry task such as aligning 90° joints and edges of the objects, leveling cabinets, shelf and countertops installation.

A second type of level is a line laser level and is a little more versatile than the dot laser level. In contrast to the single dot, a line laser level projects horizontal and vertical cross-lines on the wall. The line laser level is ideal for those who need horizontal and vertical leveling on their projects. This type of laser level is static and the user has to transfer the point or continuous line manually from one side of the room to the other end, while another 90° horizontal line is fixed. This type of laser level is more complex than the dot laser level and usually requires more complicated placement for repeatable results.

Line laser levels are used for more complex jobs by contractors, electricians, carpenters and glaziers for various leveling tasks. For example, home contractors can use the line laser level for initiating projects like drywall installation, HVAC, leveling ceiling joist and alignment of rafter, hanging wallpaper and stenciling or painting, sprinkler installation and tiling of walls and floors. Electricians use this type of tool for installing electrical outlets and switches, aligning conduit and wiring and tracking lighting. Line laser levels can also be very useful for glaziers or the glass craftsmen in installing glass curtain walls or shower walls. This type of laser device is mostly in installing glass windows. Also, many carpenters use this tool for finishing their carpentry tasks such as alignment of cabinet and counter top, installing soffits, alignment of closet shelves or doors, leveling chair rail or trimming to equalize the rail and paneling or wainscoting.

A rotary laser level projects a line or lines of red, yellow or green laser light with the help of built-in laser and mirrors. This type of laser level is designed with a rotating projecting unit with rotary motor that spins the light around the enclosed space that requires the leveling. With the laser light projected from this tool, the whole area gets covered, which can be very helpful for those who need a projection on the whole room to complete their leveling tasks. The rotary laser levels are ideal when accurate measurements and calculations at required distance are necessary. Because rotary lasers generally are desired as they project a far brighter line, accomplishing the projection of a line by mechanical movement of a dot rather than the optical dispersion of a single dot by prismatic refraction, this type of laser level is used for the most complex jobs over greater areas.

Rotary laser levels can be used for accomplishing various leveling based projects. This type of laser level is mostly used by large site contractors, electricians, home builders, deck builders, farmers and landscapers. Construction site contractors use this tool for leveling, checking cut and filling, setting foundations and footings, measuring concrete pours, excavations of septic tanks and basement and establishing acoustical ceiling and drywall. Typically, home builders will use a rotary laser for aligning or plumbing walls and metal stud and wood framers management. Deck builders might use the rotary laser for leveling deck floors and establishing diagonals and footings for decks or patios. Because of its brighter projection, rotary laser levels can also be very useful for outdoor use. It can be used by farmers for accomplishing counter farming and also managing drainage, which is one of the most important basics of farming. Also landscapers can use this device for various leveling projects like terracing and retaining walls. The rotary laser significantly lessens the labor necessary to meet the highly demanding schedules and enhanced precision requirements in modern construction.

In every instance where a laser is used, the craftsman will select an offset necessary to best exploit the projected dot or line. The laser is not aligned to the surface to be rendered plumb, level or squared but, rather, the laser is projected just off of the surface and measurements are made from the projected laser beam to the surface to be measured. If every point is equally distant from the surface, the surface must, by definition, be level, plumb or squared. For example, when a supporting structure is constructed to support a deck, the experienced carpenter will select an offset from a known architectural feature such as the exemplary wall 1, so that the laser projection can be placed clear of the actual surface of the wall 1 so that small irregularities do not block that projection. In this example, it would not be unreasonable to select six inches as the offset. Thus, at every measuring point, the carpenter places an end of a measurement device, either a stick, square or tape and, then, seeks to intersect the laser projection to get a reading as to the actual offset at the measured point to the work and from that subtracts the six inch offset. Where the laser light is projected at the six inch point on the scale, the structure is exactly where it ought to be. Should the laser intersect the measuring device at a point on the scale having, for example, a height of six and three quarters inches, demarcation, the structure may require shimming to bring it to a level of exactly six inches. On the other hand, should the laser intersect the measurement device a a level of five and fifteen sixteenths, the structure might require the use of a plane to remove a uniform sixteenth of an inch to bring the structure into compliance. In such a manner, the carpenter can be assured of a state of "trueness" not available with the traditional snapping of a carpenter's chalk line to mark the offset. Gravity affects such lines in a manner that does not affect the laser's beam. In such use, the carpenter can be assured of a far truer deck making all of the related measurements much more regular as they are based upon a very flat, planar deck.

But, the question is how does one normally exploit such a laser. FIG. 1 herein shows a user 2 using a prior art tape measure assembly 4 comprising a housing 6 and a prior art tape 8. In use, the laser level 10 projects a horizontal beam 12 which, when it strikes a wall 1 whose plumbness is being measured, projects a spot 12s. To check that plumbness, the user 2 will take several measurements immediately above the spot 12s. The tape 8 extends from the wall 1 to a horizontal laser beam 14 which illuminates the tape 8 at a given spot corresponding with a measurement of the distance between the laser beam 14 and the wall 1.

FIG. 1 reveals the principal shortcoming of the prior art is evident in FIG. 1. To illuminate the tape 8, the tape 8 on the side with its markings must be turned towards the laser 14 so that the reverse of the tape does not block the beam 14. Thus, to read the measurement markings where the beam 14 intersects the tape 8, the user 2 must be beneath the tape 8. After several such measurements, even the most fit user 2 might soon object to such because of pains in the back or knees. What is needed in the art is a method by which the user 2 might read a tape 8 wherein the tape 8 is illuminate from the rear.

SUMMARY OF THE INVENTION

A tape measure to be reeled on a spool rotatably mounted within a housing defining an opening for paying out and for retrieval by rotation of the spool within in the housing. The tape measure includes a tape having a first end and a second end. The first end connected to the spool and the second end movable through the opening between a retracted position and an extended position. The tape includes a steel blade with length markings on the obverse. The blade extends along its length from the first end to the second end having a window. The window includes a pane of polymer. The polymer includes pigments to selectively transmit laser emitted from a laser level. The pane is held within the window in a manner allowing the reel to pay out and retract the blade in use.

The tape is used in a method for measuring an offset between an architectural feature. The tape includes a first end and a second end; the first end is connected to the spool and the second end is configured to be movable through the opening between a retracted position and an extended position. The tape includes a steel blade with length markings on the obverse. The blade extends along its length from the first end to the second end and defines a window. The window extends parallel to the length. A pane of polymer resides within the window. The polymer includes pigments to selectively transmit a laser beam emitted from a laser level. The pane is held within the window in a manner allowing the reel to pay out and retract the blade in use.

To use the inventive tape, a user places a laser level relative to the relevant architectural feature. The laser lever emits a true vertical laser beam. The user, then, places the tape such that the true vertical laser beam intersects the tape at the pane of polymer to produce an illuminated laser spot therein. The user is then able to read the length marking proximate to the laser spot and thereby to determine the offset from the architectural feature in question.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
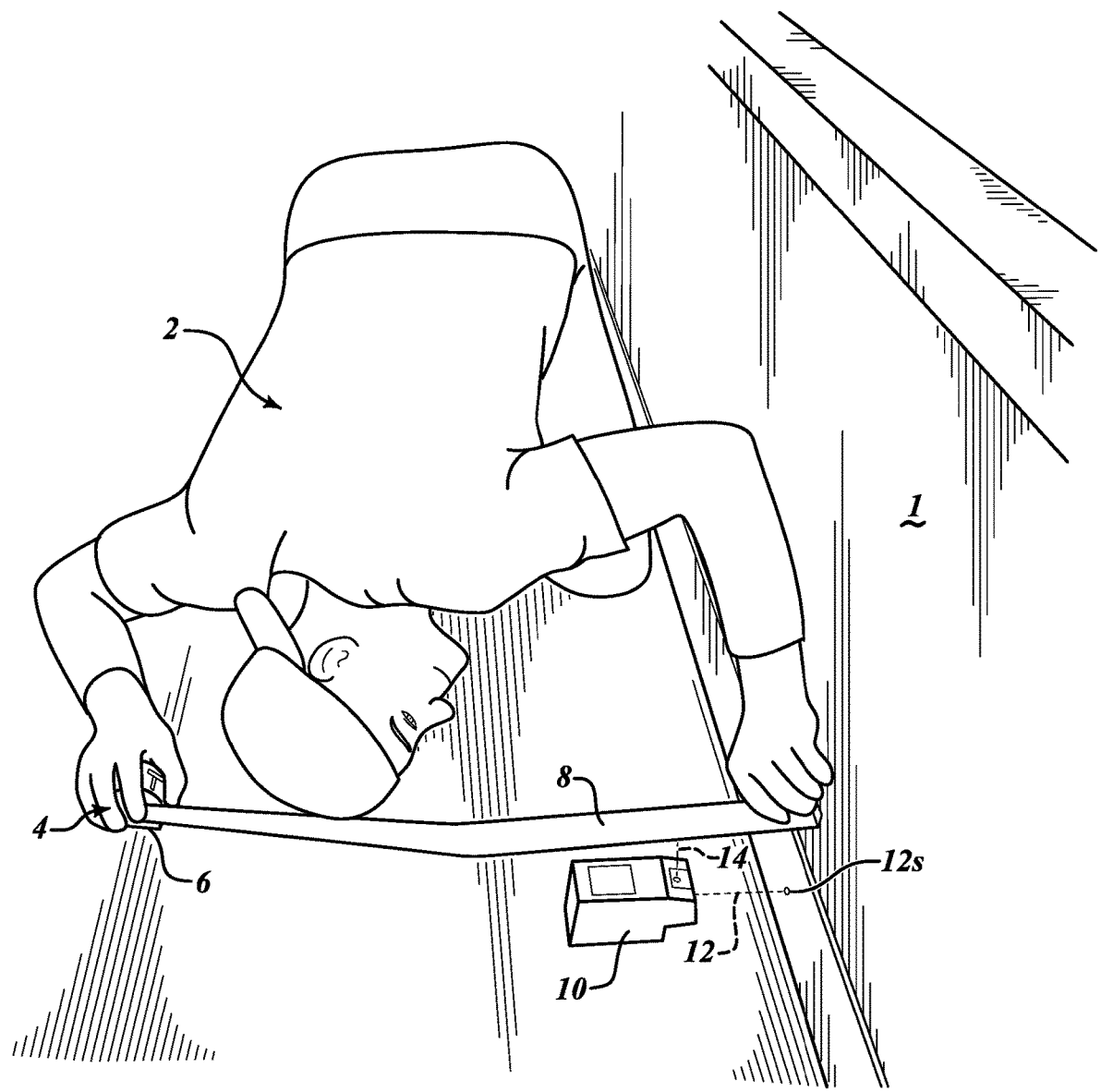
FIG. 1 depicts a user in a posture to employ a prior art tape measure in conjunction with a laser level.
Figure 2:
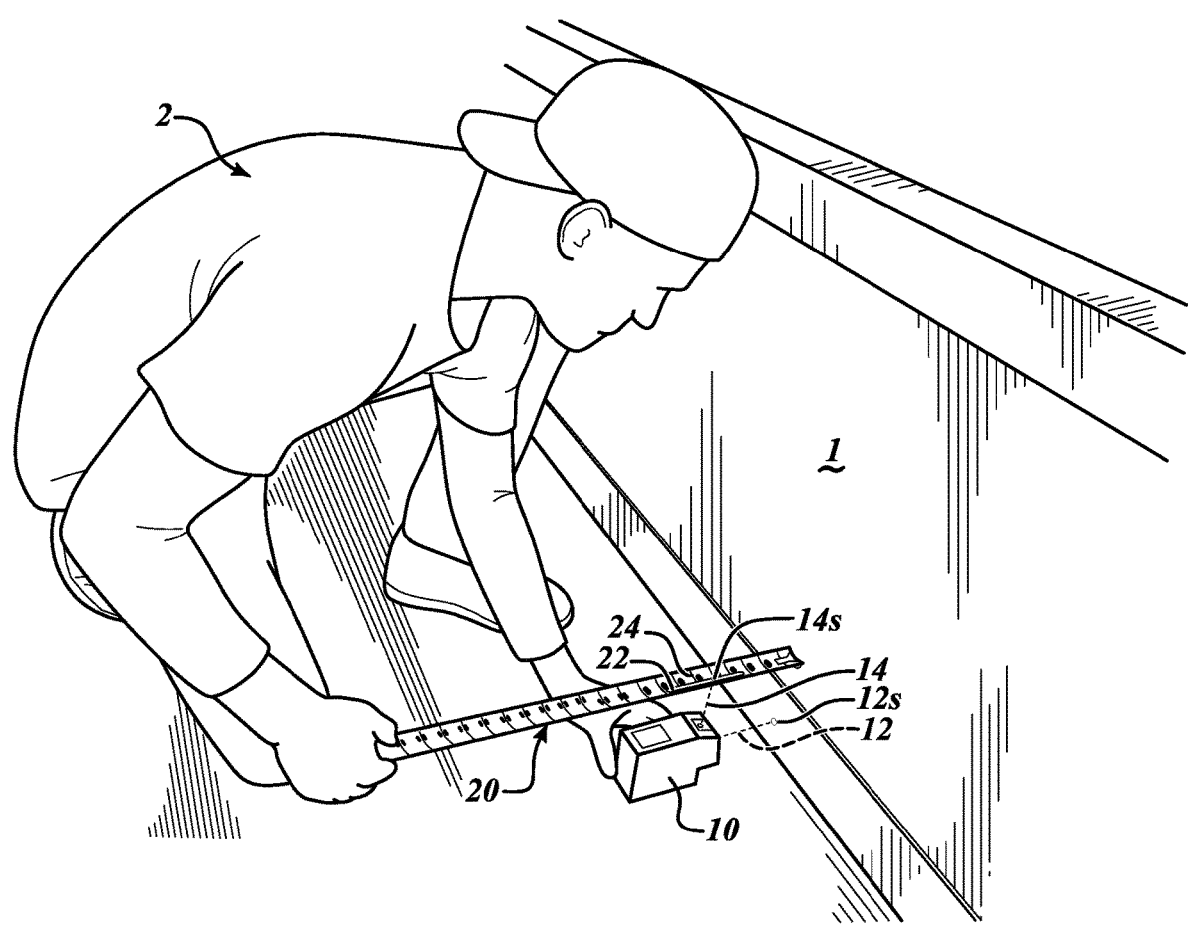
FIG. 2 depicts the user in an alternate posture to employ an inventive tape measure having a laser dispersion window, when used in conjunction with the laser level.

In the use of the inventive tape measure by the user 2 as depicted in FIG. 2 shows the advantageous feature of a window 22 let into an inventive tape 20. As in FIG. 1, the task the user 2 seeks to perform is the checking of the wall 1 for plumbness. Once again, the laser level 10 projects a horizontal beam 12 which, when it strikes a wall 1 whose plumbness is being measured, projects a spot 12s. To check that plumbness, the user 2 will take several measurements immediately above the spot 12s.

Here, in FIG. 2 by contrast with the user 2 as depicted in FIG. 1, however, the advantage of an inventive tape 20 becomes evident. The user 2 views the inventive tape 20 from its written obverse and that obverse faces upwards as the inventive tape 20 extends from the wall 1 to intersect the horizontal laser beam 14 which illuminates the inventive tape 20. The window 22 allows the horizontal laser beam 14 to project a spot 14s which is visible through the window 22, and the location of the spot 14s corresponds with a measurement of the distance between the laser beam 14 and the wall 1. But, however, the inventive tape 20 includes a tape window 22 adjacent to the measurement markings 24 (in this nonlimiting exemplary case, in inches). In contrast to the user 2 as depicted in FIG. 1, the user 2 looks down at the inventive tape 20 rather than having to get beneath the inventive tape 20 and crane the neck to see the obverse of the inventive tape 20. As may be recalled, in order to illuminate the prior art tape 8 (FIG. 1), the tape 8 on the side with its markings must be turned towards the laser 14 so that the reverse of the tape does not block the beam 14. In contrast to the prior art tape 8 as depicted in FIG. 1 the user 2 finds in the inventive tape 20 the opportunity to view the view the obverse of the tape while viewing the spot 14s transmitted through the window 22, the user finds himself in a far more comfortable posture in use.

Figure 3:
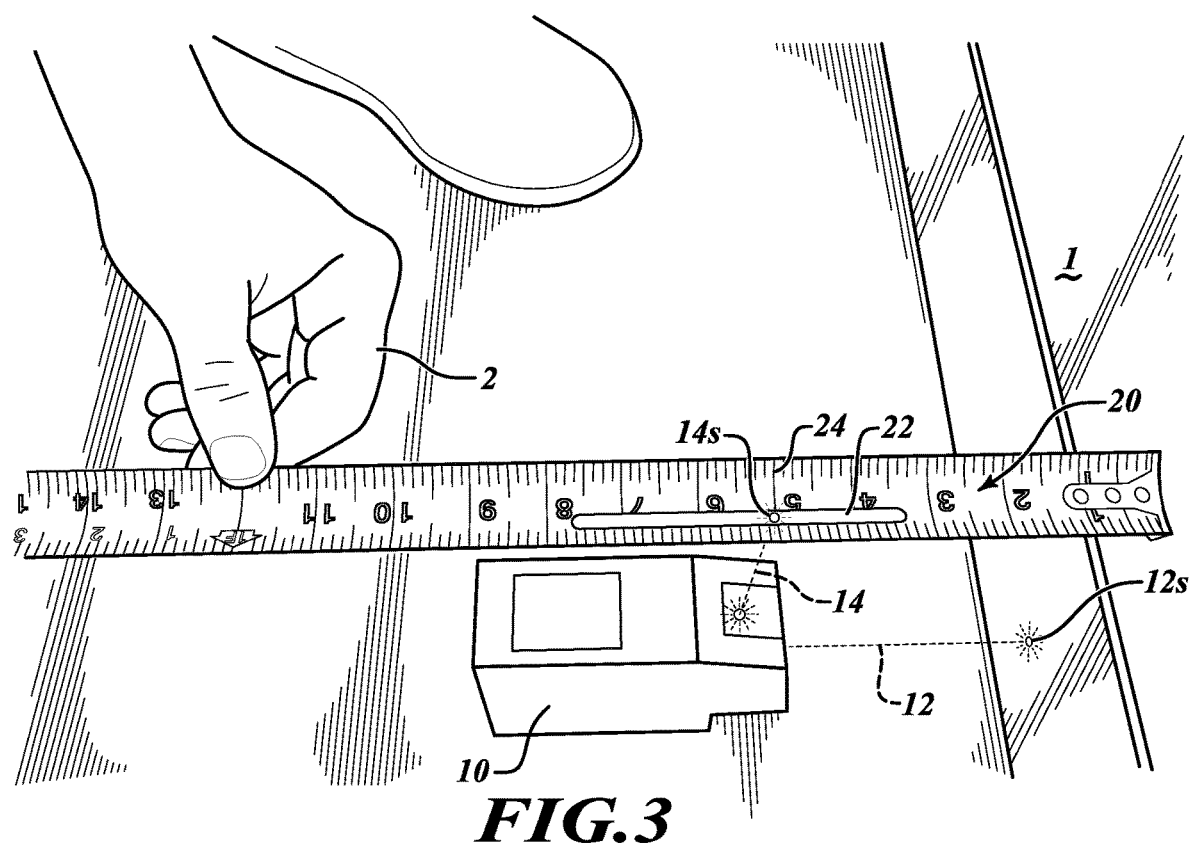
FIG. 3 depicts a detail view of the user in the alternate posture to employ the inventive tape measure having the laser dispersion window, when used in conjunction with the laser level.

FIG. 3 depicts, in detail the use of the inventive tape 20 as shown in FIG. 2, specifically, the position of the inventive tape 20 relative to the wall 1. The window 22 comprises a pane (not separately marked) of a polymeric material which is selected to allow the spot 14s and its location to certainly be observed by the user 2 and to be "read" with certainty. In preferred embodiments of the inventive tape 20, the pane the window 22 comprises is selected to be of a particular color to enhance the visibility of the spot 14s. In simplest terms, Red windows are used to see red lasers, green windows are used to see green lasers, and so on. Selection of the color of the window 22 enhance the visibility of the spot 14s by reducing or eliminating light other than the color they are designed to make more visible. The window 22 does not brighten the laser, but by reducing or removing other light waves from the vision of the wearer, the laser appears brighter. The monochromatic nature of a laser beam is a feature that makes the laser work as a marking device.

In contrast to laser light, light from a conventional light source is extremely broadband (containing wavelengths across the electromagnetic spectrum). The wavelength (measured in nanometers (nm)) of the light defines the color that we perceive. If one were to place a filter that would allow only a very narrow band of wavelengths in front of a white or broadband light source, only a single light color would be seen exiting the filter. Light from the laser is similar to the light seen as passing through a filter. The color or wavelength of light being emitted depends on the type of lasing material being used. The primary wavelengths of laser radiation for current military and commercial applications include the ultraviolet, visible, and infrared regions of the spectrum. Ultraviolet radiation for lasers consists of wavelengths between 180 and 400 nm. The visible region consists of radiation with wavelengths between 400 and 700 nm. This is the portion we call visible light.

In considering capability of an eye of the user 2, visible and near infrared radiation passes through the cornea, and is focused on and absorbed by the retina. The wavelength of the light that determines the visible sensation of color: violet at 400 nm, red at 700 nm, and the other colors of the visible spectrum in between. The most common laser emitters for laser levels are red (630 nm-670 nm), green (520 nm and 532 nm) and violet (405 nm and 445 nm). Our eyes are most sensitive to green light. Thus a green laser will appear brighter than a red or violet laser, even though the power output is the same.

The standard laser level 10 emits a beam of a single narrow wavelength with very little light at wavelengths other than the central peak. The coherence of a laser enables it to travel in a narrow beam with a small and well defined divergence or spread. This allows a user 2 to define exactly the area illuminated by the laser beam 14. Because of coherence the laser beam 14, in use projects a focused small and intense spot 14s. This quality of an emitted laser beam 14 produces a very small and therefore precise spot 14s which well locates the wall 1 relative to the laser level 10.

Figure 4:
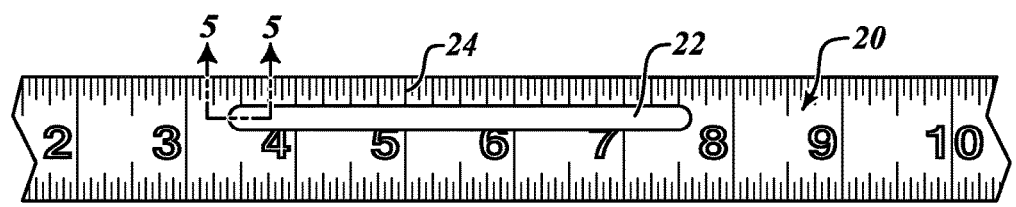
FIG. 4 is a plan view of the inventive tape showing the laser dispersion window inset in the tape.
Figure 5:
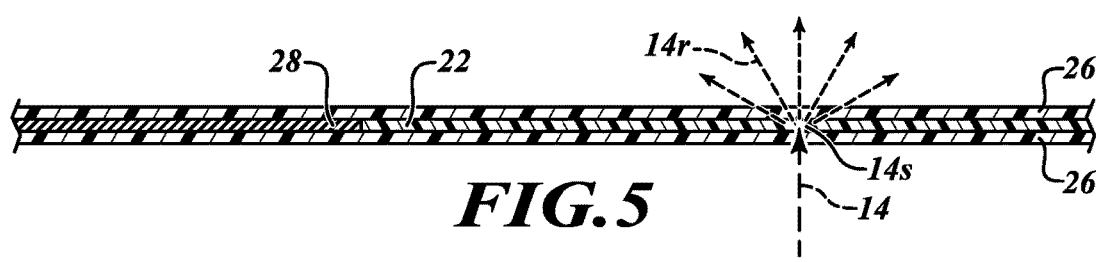
FIG. 5 is a cross-sectional view of the inventive tape showing an exemplary construction to hold the laser dispersion window and lens in fixed relation in spite of the flexible nature of the tape.

Viewing FIGS. 4 and 5 demonstrate the qualities of the inventive tape 20 comprising a blade including a first end and a second end, the first end connected to the spool and the second end movable through the opening between a retracted position and an extended position; the blade comprising the window 22. Additional features may, optionally, be provided, for instance, with a waterproof coating that whisks away water and other contaminants. Just as is common with conventional tape measures 8 (FIG. 10), the inventive tape measure 20 includes a nylon clad steel blade 28 that is about one-half inch in width with other arrangements and widths being possible. While the steel blade 28 bears, on its obverse, markings to show imperial or "inch markings" another embodiment includes dual sided printing on the obverse, imperial on top, and a 1/10 engineers scale on the bottom. Yet another embodiment might be metric in its markings.

Advantageously, just as conventional tapes 8 often include tape tear solution, the inventive tape may, in some embodiments, incorporate both a tear solution and the inventive window in the very same inventive tape 20. The tape tear solution provides an extra coating on the blade to reduce the likelihood of tearing. As illustrated, the tape tear coating is provided on at least the last foot of the inventive tape 20 toward the leading end where tearing is most likely to occur. Such an embodiment of the inventive tape 20 employing this tear solution includes outer layers 26 of nylon or another material. In such instances, the dyed polymer that makes up the window 22 is inset in the steel blade 28 that makes up the inventive tape 20 as the two are sandwiched between layers 26 of transparent tear solution thereby fixing the window 22 material relative to the steel blade 28.

In addition to these inventive features, the inventive tape measure 20 may include what are recognized as conventional features to help maintain the accuracy of the measurements acquired with the tape measure 20. The blade 28 may be an anti-stretch blade with up to 30 percent less stretch than prior tape measure blades. The tape measure 20 may include an accuracy scale. Such a scale informs a user 2 of the accuracy of the tape measurement based on the current temperature. If the temperature is warm or cold enough to alter the length of the steel blade 28, the accuracy scale will inform the user that the measurement is over or under an accurate measurement and can provide an adjustment based on the actual temperature.

The materials used to make up the pane of the window 22 are selected to reflect, absorb, or transmit specific light rays. If light is incident upon an interface separating two transmitting media (as an air-glass interface), some light will be transmitted while some will be reflected from the surface. Any translucent material used for the window 22 will both transmit and reflect light such as that laser beam 14. If no energy is absorbed at the interface, T+R=1 where T and R are the fractions of the incident beam intensity that are transmitted and reflected. T and R are called the transmission and reflection coefficients, respectively. These coefficients depend not only upon the properties of the material and the wavelength of the radiation, but also upon the angle of incidence. The amount of the incident light beam that is reflected and the amount transmitted through the material is further dependent on, where it exists, the polarization of the light beam. Selected materials may also be used to isolate a laser beam, reflecting or absorbing all other wavelengths. Ideally, the material selected for the window 22 will provide exceptional transmission of desired wavelengths while effectively reflecting all unwanted wavelengths.

Because the user 2 has no need to discern any detail through the window 22 beyond the actual location of the spot 14s relative to the markings 24, there is no need to transmit other colors than that of the monochromatic beam 14 the laser emits. The window 22, especially as shown in FIG. 5, works best when the selected material the pane comprises receives a laser beam 14 to portray a spot 14s visible throughout a wide angle in various reflected or refracted rays 14r making the spot 14s visible to the user 2 who might view the window 22 from an off-axis location.

In the presently preferred embodiment, the window 22 is constructed out of flexible polymers and dyes and can bend to conform to both flat and curved shapes. Such materials produce windows 22 that are resistant to scratches and are as durable as most industry hard oxide coatings. In one embodiment, the window 22 comprises hundreds to thousands of sub-layers. In such a manner, the window 22 can achieve high wavelength selectivity across the visible spectrum and are ideal the inventive tape 20 applications due to the low cost, light weight, and thin and flexible nature.

Coincidentally, the materials selected for the panes of windows 22 have a few disadvantages that mostly stem from the polymer substrate, but these are not really disadvantages in the context of the inventive tape 20. For example, most suitable polymers have a limited operating temperature and should be used within 85° F. of room temperature to prevent damage to the polymer layer matrix. Most users, however, will not, themselves, work outside of such a range nonetheless and even when so used, the window generally will work in the prescribed manner after adjusting the temperature by simply allowing the user 2 to warm the tape to use.

The invention claimed is:

1. A tape measure to be reeled on a spool rotatably mounted within a housing defining an opening for paying out and for retrieval by rotation of the spool within in the housing, the tape measure comprising:
   a tape including a first end and a second end, the first end connected to the spool and the second end movable through the opening between a retracted position and an extended position, the tape comprising:
      a steel blade with length markings on the obverse, the blade extending along its length from the first end to the second end and defining a window therein, the window being defined to extend parallel to the length; and
      a pane of polymer, the polymer including pigments to selectively transmit laser emitted from a laser level, the pane being held within the window in a manner allowing the reel to pay out and retract the blade in use.

2. The tape measure of claim 1, wherein the steel blade defines the window as extending within only that part of the blade extending along its length approximately twelve inches from first end.

3. The tape measure of claim 2, wherein the steel blade defines the window as extending within only that part of the blade extending along its length from a position proximate to the 3½ inch marking to the 7½ inch marking.

4. The tape measure of claim 1, wherein the pane of polymer is selected to transmit laser light at a wavelength selected from a range from violet at 400 nm to red at 700 nm.

5. The tape measure of claim 4, wherein the pane of polymer is selected to transmit laser light from a group of laser light wavelengths consisting of red (630 nm to 670 nm), green (520 nm to 532 nm) and violet (405 nm to 445 nm).

6. A method for measuring an offset between an architectural feature, the method comprising:
   providing a tape including a first end and a second end, the first end connected to the spool and the second end movable through the opening between a retracted position and an extended position, the tape comprising:
      a steel blade with length markings on the obverse, the blade extending along its length from the first end to the second end and defining a window therein, the window being defined to extend parallel to the length; and
      a pane of polymer, the polymer including pigments to selectively transmit laser emitted from a laser level, the pane being held within the window in a manner allowing the reel to pay out and retract the blade in use;
   placing a laser level relative to the architectural feature, the laser lever emitting a true vertical laser beam;
   placing the tape such that the true vertical laser beam such that its first end abuts the architectural feature at a first measurement point and the laser beam intersects the tape at the pane of polymer to produce an illuminated laser spot therein; and
   reading a first length marking proximate to the laser spot.

7. The method of claim 6, wherein the steel blade defines the window as extending within only that part of the blade extending along its length approximately twelve inches from first end.

8. The method of claim 7, wherein the steel blade defines the window as extending within only that part of the blade extending along its length from a position proximate to the 3½ inch marking to the 7½ inch marking.

9. The method of claim 6, wherein the pane of polymer is selected to transmit laser light at a wavelength selected from a range from violet at 400 nm to red at 700 nm.

10. The method of claim 9, wherein the pane of polymer is selected to transmit laser light from a group of laser light wavelengths consisting of red (630 nm to 670 nm), green (520 nm to 532 nm) and violet (405 nm to 445 nm).

11. The method of claim 6 further including:
   to determine plumbness of the architectural features, placing the tape such that the true vertical laser beam such that its first end abuts the architectural feature at a second measurement point vertically aligned with the first measurement point and the laser beam intersects the tape at the pane of polymer to produce an illuminated laser spot therein; and
   reading a second length marking proximate to the laser spot.

12. The method of claim 11 further including:
   to further determine plumbness of the architectural features, placing the tape such that the true vertical laser beam such that its first end abuts the architectural feature at a third measurement point vertically aligned with the first measurement point and second measurement point and the laser beam intersects the tape at the pane of polymer to produce an illuminated laser spot therein; and
   reading a third length marking proximate to the laser spot.

13. A tape for use in a tape measure, the blade to be reeled on a spool rotatably mounted within a housing defining an opening for paying out and for retrieval by rotation of the spool within in the housing, the tape comprising:

a steel blade including a first end and a second end, the first end configured for connection to the spool and the second end movable through the opening between a retracted position and an extended position, with length markings on the obverse, the blade extending along its length from the first end to the second end and defining a window therein, the window being defined to extend parallel to the length; and a pane of polymer, the polymer including pigments to selectively transmit laser emitted from a laser level, the pane being held within the window in a manner allowing the reel to pay out and retract the blade in use.

14. The tape of claim 13, wherein the window the steel blade defines extending within only that part of the blade extending along its length to approximately twelve inches from first end.

15. The tape of claim 14, wherein the steel blade defines the window as extending within only that part of the blade extending along its length from a position proximate to the 3½ inch marking to the 7½ inch marking.

16. The tape of claim 13, wherein the pane of polymer is selected to transmit laser light at a wavelength selected from a range from violet at 400 nm to red at 700 nm.

17. The tape of claim 16, wherein the pane of polymer is selected to transmit laser light from a group of laser light wavelengths consisting of red (630 nm to 670 nm), green (520 nm to 532 nm) and violet (405 nm to 445 nm).

* * * * *